UNITED STATES PATENT OFFICE.

SAMUEL U. BRUNCK AND GEORGE A. MARSH, JR., OF SANDUSKY, OHIO, ASSIGNORS, BY MESNE ASSIGNMENTS, TO HENRY W. WAGENET, JOHN H. WAGENET, AND EMIL PUSCH, ALL OF SAME PLACE.

CALCIMINE COMPOUND.

SPECIFICATION forming part of Letters Patent No. 328,645, dated October 20, 1885.

Application filed October 27, 1884. Serial No. 146,581. (No specimens.)

*To all whom it may concern:*

Be it known that we, SAMUEL U. BRUNCK and GEORGE A. MARSH, Jr., both of Sandusky, in the county of Erie and State of Ohio, have invented certain new and useful Improvements in Calcimine Compounds, of which the following is a full, clear, and exact description.

This invention has for its object the improvement of various calcimining compounds or materials, including adamantine and others known as or producing what is known as "wall-finish;" and the invention consists in mixing or combining cotton-seed oil with the calcimining compound or material, which will not only give greater ease and smoothness in spreading the calcimine, but will prevent the first or any subsequent coat of it from rubbing or pulling up or cutting through when any subsequent coat is applied, inasmuch as the oil will give to the whole when spread upon a wall or ceiling increased hardness when dry, and prevent it from rubbing off; also will make it more impervious to the action of water or dampness, and thereby prevent it from cracking or scaling off. The oil may either be introduced directly into the calcimining material or be first combined with calcined plaster into a compound and afterward mixed with the calcimine, substantially as hereinafter described.

The following examples will serve to explain how the invention may be applied.

To make an adamantine wall-finish, the adamantine is or may be made in the usual way; but before using, and while the ingredients are in solution, we add thereto cotton-seed oil, in the proportion of about one quart (1 qt.) of the oil to each one hundred pounds (100 lbs.) of the calcined plaster, and thoroughly mix or incorporate the whole. Instead, however, of mixing the oil direct with the adamantine, it may be embodied in a preparatory compound for after mixture with dry powdered adamantine. Thus we have taken in the proportion of, say, three pounds (3 lbs.) of calcined plaster and added thereto about one quart (1 qt.) of cotton-seed oil, and afterward added sufficient water and mixed the whole together to make of the mass a paste, which was subsequently dried and ground. Such ground or powdered compound has then been added to the dry powdered adamantine in the proportion of about one pound (1 lb.) of the compound to twenty pounds (20 lbs.) of the adamantine.

The same preparatory compound may also be used in like manner to improve other dry powdered calcimines and similar plastering or wall-finishing substances, and in about the same proportions—that is, about one pound (1 lb.) of the compound to each twenty pounds (more or less) of the dry powdered calcimine or similar substance.

Having thus described our invention, what we claim as new, and desire to secure by Letters Patent, is—

The within-described compound for mixture with dry powdered calcimine or other like wall-finish materials, the same consisting of calcined plaster, cotton-seed oil, and water, formed into a paste and afterward dried and ground, essentially as and in or about the proportions specified.

SAMUEL U. BRUNCK.
GEORGE A. MARSH, JR.

Witnesses:
G. A. MARSH,
CHAS. W. SADLER.